(12) United States Patent
Georgiou et al.

(10) Patent No.: US 10,181,336 B1
(45) Date of Patent: Jan. 15, 2019

(54) MULTI-BEAM OPTICAL SYSTEM FOR FAST WRITING OF DATA ON GLASS

(71) Applicant: Microsoft Technology Licensing, LLC, Redmond, WA (US)

(72) Inventors: Andreas Georgiou, Cambridge (GB); Joel Steven Kollin, Seattle, WA (US); Ariel Gomez Diaz, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/699,597

(22) Filed: Sep. 8, 2017

Related U.S. Application Data

(60) Provisional application No. 62/542,739, filed on Aug. 8, 2017.

(51) Int. Cl.
*G11B 7/0065* (2006.01)
*G03H 1/04* (2006.01)
(Continued)

(52) U.S. Cl.
CPC ........ *G11B 7/0065* (2013.01); *G02B 26/0816* (2013.01); *G02B 26/101* (2013.01); *G03H 1/0005* (2013.01); *G03H 1/0443* (2013.01); *G11B 7/00456* (2013.01); *G03H 2001/0224* (2013.01); *G03H 2210/53* (2013.01); *G03H 2222/12* (2013.01); *G03H 2222/33* (2013.01);
(Continued)

(58) Field of Classification Search
None
See application file for complete search history.

(56) References Cited

U.S. PATENT DOCUMENTS 5,535,029 A 7/1996 Clark
5,543,251 A * 8/1996 Taylor ...................... G03H 1/26
359/10

(Continued)

FOREIGN PATENT DOCUMENTS

CN 102621823 A 8/2012
EP 1186939 A2 3/2002
EP 2264839 A2 12/2010

OTHER PUBLICATIONS

Nolte, et al., "Femtosecond waveguide writing: a new avenue to three-dimensional integrated optics", In Journal of Applied Physics A, vol. 77, Issue 1, Jun. 2003, pp. 109-111.
(Continued)

*Primary Examiner* — Peter Vincent Agustin
(74) *Attorney, Agent, or Firm* — Alleman Hall Creasman & Tuttle LLP

(57) ABSTRACT

An optical data-recording system comprises a laser, a dynamic digital hologram, an electronic controller, and a scanning mechanism. The dynamic digital hologram includes a plurality of holographic zones, and is configured to direct the irradiance received thereon to an optical recording medium. The electronic controller is operatively coupled to the dynamic digital hologram and configured to control the irradiance directed from each of the holographic zones. The scanning mechanism is configured to change a relative positioning of the laser versus the dynamic digital hologram so that each of the holographic zones is irradiated in sequence by the laser.

20 Claims, 9 Drawing Sheets

(51) Int. Cl.

| | | |
|---|---|---|
| *G02B 26/08* | (2006.01) | |
| *G02B 26/10* | (2006.01) | |
| *G11B 7/0045* | (2006.01) | |
| *G03H 1/00* | (2006.01) | |
| *G03H 1/02* | (2006.01) | |

(52) U.S. Cl.
CPC ..... *G03H 2222/36* (2013.01); *G03H 2225/21* (2013.01); *G03H 2225/22* (2013.01); *G03H 2225/25* (2013.01); *G03H 2226/02* (2013.01)

(56) References Cited

U.S. PATENT DOCUMENTS

| | | | | |
|---|---|---|---|---|
| 5,661,577 | A * | 8/1997 | Jenkins | G02B 5/32 359/11 |
| 5,844,700 | A * | 12/1998 | Jeganathan | G03H 1/0248 359/22 |
| 5,870,227 | A | 2/1999 | Rope et al. | |
| 6,266,167 | B1 * | 7/2001 | Klug | G02B 5/0252 359/12 |
| 6,293,898 | B1 * | 9/2001 | Yang | G02B 5/32 359/15 |
| 6,315,575 | B1 | 11/2001 | Kajimoto | |
| 6,373,806 | B1 * | 4/2002 | Kitamura | G11B 7/0025 369/103 |
| 6,545,968 | B1 | 4/2003 | Oakley | |
| 6,710,901 | B2 | 3/2004 | Pastor | |
| 6,897,433 | B2 | 5/2005 | Itoh et al. | |
| 6,999,397 | B2 | 2/2006 | Roh et al. | |
| 7,200,097 | B2 | 4/2007 | Meyrueis et al. | |
| 7,502,157 | B1 | 3/2009 | Dueweke | |
| 7,733,557 | B2 | 6/2010 | Handschy et al. | |
| 8,605,561 | B2 | 12/2013 | Gladney et al. | |
| 8,808,944 | B2 | 8/2014 | Lawrence et al. | |
| 9,474,143 | B2 | 10/2016 | Zhan et al. | |
| 9,734,858 | B2 | 8/2017 | Barada et al. | |
| 2005/0180291 | A1 * | 8/2005 | Ogasawara | G11B 7/0065 369/103 |
| 2006/0280094 | A1 * | 12/2006 | Tsukagoshi | G02B 26/12 369/103 |
| 2007/0139586 | A1 | 6/2007 | Gu et al. | |
| 2008/0254372 | A1 | 10/2008 | Wu | |
| 2009/0207710 | A1 * | 8/2009 | Ayres | G11B 7/0065 369/53.35 |
| 2010/0046050 | A1 | 2/2010 | Kroll et al. | |
| 2010/0118219 | A1 | 5/2010 | Leister | |
| 2010/0125356 | A1 * | 5/2010 | Shkolnik | G06T 1/00 700/98 |
| 2010/0195178 | A1 | 8/2010 | Leister et al. | |
| 2011/0094585 | A1 | 4/2011 | Debije et al. | |
| 2012/0300608 | A1 * | 11/2012 | Masumura | G01N 21/4795 369/103 |
| 2013/0021545 | A1 | 1/2013 | Song et al. | |
| 2013/0128711 | A1 | 5/2013 | Kim | |
| 2014/0009808 | A1 * | 1/2014 | Wang | G02F 1/33 359/10 |
| 2014/0078878 | A1 * | 3/2014 | Tsuyama | G11B 7/245 369/116 |
| 2014/0204437 | A1 * | 7/2014 | Ayres | G03H 1/265 359/11 |
| 2015/0277551 | A1 * | 10/2015 | Travis | G06F 3/013 345/156 |

OTHER PUBLICATIONS

<Kazansky, et al., "Eternal 5D data storage by ultrafast laser writing in glass", In Proceedings of SPIE, vol. 9736, Mar. 2016, 4 Pages.
Dunayevsky, J. et al., "MEMS Spatial Light Modulator for Phase and Amplitude Modulation of Spectrally Dispersed Light", Journal of Microelectromechanical Systems, vol. 22, No. 5, Oct. 2013, 9 pages.
Eng, S. et al., "Optimization of Liquid-Crystal Spatial Light Modulator for Precise Phase Generation", In Proceedings of the Conference on Optoelectronic and Microelectronic Materials and Devices, Dec. 6, 2006, Perth, Australia, 5 pages.
Granger, C., "Polarization Control of Light with a Liquid Crystal Display Spatial Light Modulator," Thesis Presented to the Faculty of San Diego State University, 2013, 80 pages.
Kumar, A. et al., "Making an optical vortex and its copies using a single spatial light modulator," Physics Letters A, vol. 375, Issue 41, Sep. 26, 2011, 7 pages.
Lin, et al., "Polarisation-independent liquid crystal devices", In Journal of Journal Liquid Crystals Today, vol. 17, No. 1-2, Jul. 2008, pp. 2-8.
Lin, et al., "A Polarizer-free Liquid Crystal Display using Dye-doped Liquid Crystal Gels", In Journal of Materials, vol. 2, Oct. 26, 2009, pp. 1662-1673.
Meneses-Fabian, C. et al., "Polarized light by quadrature amplitude modulation" Journal of Optics and Lasers in Engineering, vol. 51, Iss. 4, Apr. 2013, 2 pages.
"Phase spatial light modulator LCOS-SLM", In Publication of Hamamatsu, Available as Early as Feb. 26, 2015, 14 pages.
Putten, et al., "Spatial amplitude and phase modulation using commercial twisted nematic LCDs", In Journal of Applied Optics vol. 47, Issue 12, Apr. 20, 2008, pp. 1-13.
Reichelt, S. et al., "Computational hologram synthesis and representation on spatial light modulators for real-time 3D holographic imaging", In Proceedings of the 9th International Symposium on Display Holography (ISDN 2012), Jun. 25, 2012, Cambridge, Massachusetts, USA, 10 pages.
"Spatial Light Modulators" Holoeye Website, Retrieved Online at http://holoeye.com/spatial-light-moduators/, Dec. 11, 2016, 3 pages.
Georgiou, A. et al., "Data Storage Using Light of Spatially Modulated Phase and Polarization," Application as Filed in U.S. Appl. No. 15/894,778, dated Feb. 12, 2018, 35 pages.
Wang, T. et al., "Generation of perfect polarization vortices using combined grating in a single spatial light modulator," In Journal of Applied Optics, vol. 56, Issue 27, Sep. 20, 2017, 1 page.
Weng, L. et al., "High-efficiency and fast-switching field-induced tunable phase grating using polymer-stabilized in-plane switching liquid with vertical alignment", Journal of Physics D Applied Physics, vol. 49, No. 12, Feb. 23, 2016, 7 pages.
Yang, D., "Review of operating principle and performance of polarizer-free reflective liquid-crystal displays", Journal of the Society for Information Display, vol. 16, Iss. 1, Jan. 2008, 3 pages.
Zhang, J. et al., "5D Data Storage by Ultrafast Laser Nanostructuring in Glass," In Proceedings of the CLEO: Science & Innovations Conference, San Jose, CA, USA, Jun. 9, 2013, 2 pages.
Zhang, Z. et al., "Fundamentals of phase-only liquid crystal on silicon (LCOS) devices," In Journal of Light: Science and Applications, vol. 3, Oct. 24, 2014, 10 pages.
Zhu, et al., "Arbitrary manipulation of spatial amplitude and phase using phase-only spatial light modulators", In Journal of Scientific reports, vol. 4, Dec. 11, 2014, pp. 1-7.
Wang, J. et al., "The Polarization Multiplexing Image with a Single Diffractive Optical Element," In Journal of IEEE Phototonics, vol. 9, No. 3, Jun. 2017, 9 pages.
"International Search Report and Written Opinion Isssued in PCT Application No. PCT/US2018/038654", dated Sep. 25, 2018, 13 Pages.

* cited by examiner

MULTI-BEAM OPTICAL SYSTEM FOR FAST WRITING OF DATA ON GLASS

CROSS REFERENCE TO RELATED APPLICATION

This application claims priority to U.S. Provisional Application 62/542,739, filed 8 Aug. 2017, and entitled MULTI-BEAM OPTICAL SYSTEM FOR FAST WRITING OF DATA ON GLASS, the entirety of which is hereby incorporated by reference.

BACKGROUND

High-power, short-pulse laser irradiance can be used to write and store data onto a glass substrate. The irradiance induces, at its focus, long-lived or permanent structural and optical changes within the substrate medium, caused by non-linear (e.g., two-photon) absorption by the medium. In some cases, a nanoscale 3D structure with grating-like optical properties is formed at the focus of the irradiance. The term 'voxel' is used herein to refer to an individual locus of this or another induced structural or optical change within the substrate medium, which is useful for storing data.

A voxel can store data in many different forms. In principle, any of the Muller-matrix coefficients of a medium can be manipulated and used to encode data. In some examples, a voxel written onto a substrate may be modeled as a waveplate of a certain retardance $\delta d$ (measured in nanometers (nm)), and angular orientation $\phi$ (measured in degrees). Both the retardance and the orientation may be used to encode data. When a voxel is written by a polarized laser beam, the angle of the polarization determines the orientation $\phi$ of the waveplate grating, while the intensity of beam (i.e., beam power or accumulated energy) determines the strength of the grating, and accordingly, the retardance $\delta d$.

SUMMARY

The examples disclosed herein relate to an optical data-recording system comprising a laser, a dynamic digital hologram (DDH), an electronic controller, and a scanning mechanism. The dynamic digital hologram includes a plurality of holographic zones, and is configured to direct the irradiance received thereon to an optical recording medium. The electronic controller is operatively coupled to the dynamic digital hologram and configured to control the irradiance directed from each of the holographic zones. The scanning mechanism is configured to change a relative positioning of the laser versus the dynamic digital hologram so that each of the holographic zones is irradiated in sequence by the laser.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1B:
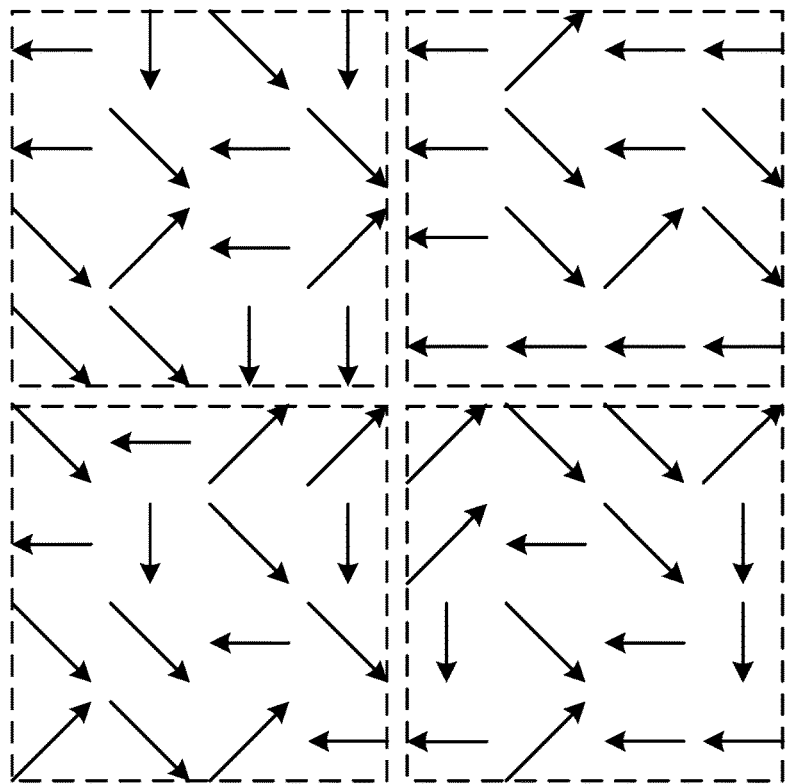
FIGS. 1A and 1B schematically illustrate an effect of splitting a single exposure of an optical recording medium substrate into multiple exposures to increase the instantaneous laser power per voxel.

This disclosure will now be presented by way of example, and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

As noted above, data can be written onto a glass or other solid substrate using a high-power, short-pulse laser, such as a polarized femtosecond laser (FSL). The result is an induced, localized birefringence, wherein the angle of the birefringence is determined by the polarization orientation, and the retardance is determined by the integrated intensity. By setting the birefringence at each localized voxel independently, for each of a series of polarization angles, each voxel may potentially store a few bits of information-specifying, e.g., one of Q different polarization angles and one of R different retardance states at each polarization angle. However, the irradiance-induced change in the refractive index of the substrate medium is a highly non-linear optical phenomenon. In order to achieve it, the instantaneous power density of the laser beam must be above a critical value, which may be expressed in pulsed-laser implementations as a critical energy density $\varepsilon_{crit}$. Below the critical energy density, the refractive index of the substrate medium will not change. Note that it maybe necessary to apply N pulses of $\varepsilon_{crit}$ energy before any permanent and useful change occurs on the glass.

Accordingly, to achieve acceptably high write speeds using this technology, two conditions are to be satisfied. First, the laser beam must be split into a plurality of independently modulated, voxel-sized child beams, so that a corresponding plurality of voxels may be written to simultaneously. Second, the power density of each of the child beams must remain above the critical power density.

One way to divide a high-power laser beam into S independently modulated child beams is with a dynamic digital hologram (DDH). The number of child beams achievable practically is about one-fourth the number of pixels on the DDH. For example, with about 10 million pixels on the DDH, one-million or more child beams may be formed. DDH devices employing nematic liquid crystals tend to have refresh rates of the order of 100 frames per second (fps).

In some implementations, a DDH may take the form of a spatial light modulator (SLM). However, any DDH capable of spatially modulating the phase and/or amplitude of a high-power laser beam may be used to create a diffractive pattern, which, when directed onto a substrate via appropriate objective optics, will simultaneously irradiate S voxels on the substrate in an independently controllable manner. In some implementations, an acoustooptical element may be used in lieu of, or in addition to an SLM.

For some display applications, splitting a laser beam into one-million child beams is practical and may be desirable. However, in applications relying on a non-linear optical process (e.g., light interacting with glass), the effect of splitting the beam by several orders of magnitude may reduce the available power density to below the critical value, where the non-linear process will cease. Moreover, depending on the power output of the laser beam and the energy of each laser pulse, the required exposure rate E for acceptable write-operation bandwidth can be on the order of many kHz. Note that the term 'exposure' is used in its general form. Within a single exposure, many voxels (here S) are created. The exposure rate is described as the number of unique optical reconfigurations occurring within a second with each configuration imprinting a group of voxels on the glass. An exposure may not be a single event in time (i.e., off-on-off) but a sequence or a scanning of the same optical configuration many times as it is the case for a pulsed laser or a scanning system (i.e., off-on-off-on-off-on-off and so on). In may be the case that many exposures may occur simultaneously or time multiplexed—i.e., the first exposure occurs in time slots 1, 3, 5 and the second in time slots 2, 4, 6. Achieving a kilohertz exposure rate with a conventional SLM may be difficult, as conventional SLMs operate typically in the range of tens to hundreds of fps. While state-of-the-art ferroelectric liquid crystal (FLC) and digital micromirror device (DMD) arrays are faster, those technologies are comparatively inefficient in terms of optical throughput. For example, an FLC DDH can update at about 2000 fps, but with efficiency of about 40 percent. MEMS DMDs have refresh rates of about 20,000 fps, but efficiencies of about 10 percent. This disclosure explores the issue of writing data onto a substrate using a high exposure rate, but mediated by a relatively low frame-rate DDH, such as a conventional LC SLM.

The limitations on write-operation bandwidth may be estimated as follows. Each voxel written on an optical substrate (also called a 'optical recording medium' herein) is assumed to contain K bits. To achieve a desired bandwidth B in bytes/second, the write frequency is $V=8*B/K$, in voxels per second. Let S be the number of voxels written simultaneously by splitting the high-power laser beam into S child beams, and let E be the exposure rate or reconfigurations of the beams. It is assumed that a voxel may be written after N laser pulses, $N \geq 1$. Accordingly, the number of voxels written per second is (at best) $V=S \times E$, and the bandwidth B is given by $$B = S \times E \times K/8. \quad (1)$$

The estimate above does not consider any mechanical delay due to the movement of the objective or other components. Applying the law of conservation of energy, $$P_L = \varepsilon_{crit} \times S \times E \times N = \varepsilon_{crit} \times N \times (K/8) \times B,$$

where $\varepsilon_{crit}$ is the minimum energy density required for non-linear effects to take place.

Another restriction is the minimum pulse energy density ($\varepsilon_p$) required by each pulse. This sets an upper limit on the number of times that the beam can be split, $$P_L = f_L \varepsilon_p$$

$$S < P_L/(f_L \times \varepsilon_p) \quad (2)$$

where the $f_L$ is the repetition frequency of the laser and $P_L$ the laser power.

Based on equations (1) and (2), the maximum write-operation bandwidth for a given laser system is achieved when $$E_{opt} = f_L/N$$

$$S = \varepsilon_p/\varepsilon_{crit} \quad (3)$$

$E_{opt}$ gives the optimum exposure rate (i.e., the number of reconfigurations required) by the system to achieve maximum bandwidth. For an example where $f_L=1$ MHz and $N=10$, the value of $E_{opt}$ is 100 kHz. As very few optical technologies can reconfigure at these speeds, examples are described below that reduce the need to do so by providing a consecutive sequence of exposures from different portions of the same reconfigured frame. The spatially modulated light is then directed to corresponding different portions of the optical recording medium.

Figure 1A:
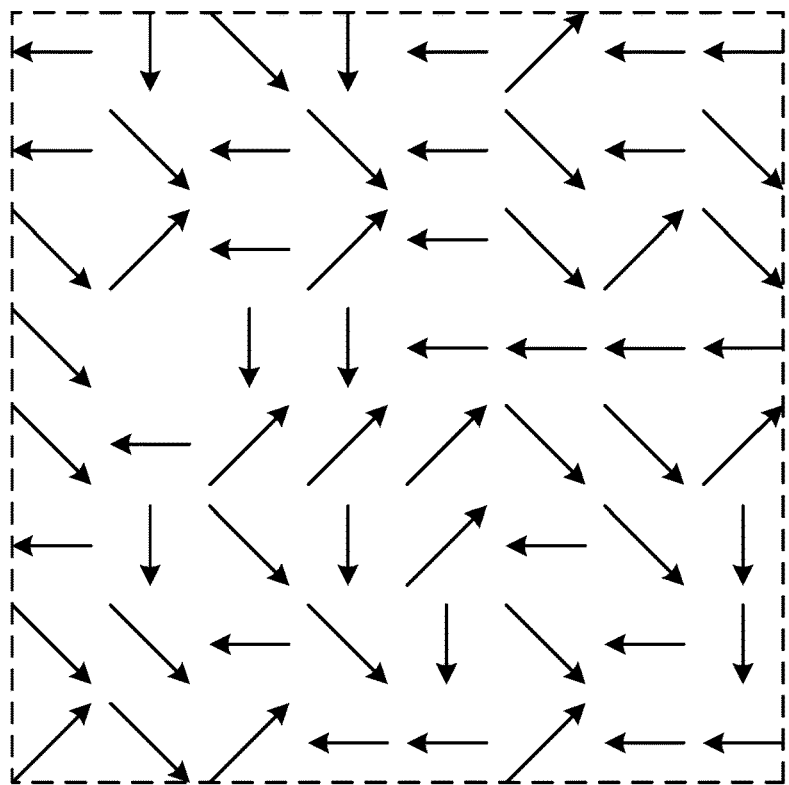

One approach to providing a supercritical power (i.e., $>\varepsilon_{crit}$) density over an entire substrate, no matter the size, is to divide the high-power laser beam into the maximum number of independently modulated child beams that will still provide a supercritical power density, and expose the substrate, one portion at a time, to those child beams. The substrate can be moved along a translational stage, for instance, so that different portions are exposed at different times. FIGS. 1A and 1B schematically illustrate the effect of splitting a single exposure into multiple exposures to increase the instantaneous laser power per voxel. In these drawings, each voxel is represented by an arrow, the direction of which indicates the birefringent state of that voxel. FIG. 1A shows a single exposure $\Delta t$ of an 8×8 rectangular array of voxels. If the laser power P is divided losslessly, with one child beam directed to each voxel, then the instantaneous power per voxel is P/64. FIG. 1B shows four exposures of 4×4 rectangular subarrays of the same voxels shown in FIG. 1A. Now, the instantaneous power per voxel is P/16. Here, the duration of each exposure may be reduced to $\Delta t/4$, so that the total writing time is the same as in the single-exposure case.

For a given write-operation bandwidth, if the beam is split into only a few child beams, then the speed of the splitting element (e.g., the DDH frame rate) must be large. In addition, it may be preferable to write concurrently all voxels accessible by the field of view (FOV) of the objective lens, so as to minimize the mechanical movement of the write head relative to the substrate. If this is achieved physically by moving the write head or the substrate, then additional limitations may be introduced due to the inertia of the head and/or the write medium. On the other hand, if S is large, then the instantaneous power density of the irradiance may fall below the critical level, and the write process may fail. Somewhere between the extrema—of not spitting the high-power laser beam (S=1) and creating a different child beam for each voxel on the medium—is a desirable value or range of S that exceeds the critical power level while limiting the need for mechanical movement.

The balance of this disclosure describes a series of approaches to achieve high write-operation bandwidth according to the analysis set forth above. The disclosed approaches employ a DDH to create a plurality of independently modulated (in terms of amplitude and/or phase and/or polarization) child beams and at least one beam scanner, which, by scanning the DDH, helps reduce or avoid physical movement required of the substrate. By illuminating different parts of the DDH over different intervals, the high-power laser beam may be split into fewer child beams, each delivering the critical power density. Moreover, pixel patterns displayed on the hologram for numerous non- or marginally overlapping zones of the substrate may be locked into the DDH during a single write operation; each zone is then exposed in rapid succession (e.g., one or more orders of magnitude faster than the frame rate of the DDH). This feature increases, in effect, the temporal bandwidth of the DDH at the expense of some of its spatial resolution. During the write operation, mechanical movement of the substrate relative to the writing beams is minimized and precisely controlled (e.g., by utilizing optical scanning). For example, an objective lens system with a wide viewing (i.e., writing) area may be used to limit relative mechanical movement between the DDH and the substrate.

Figure 2:
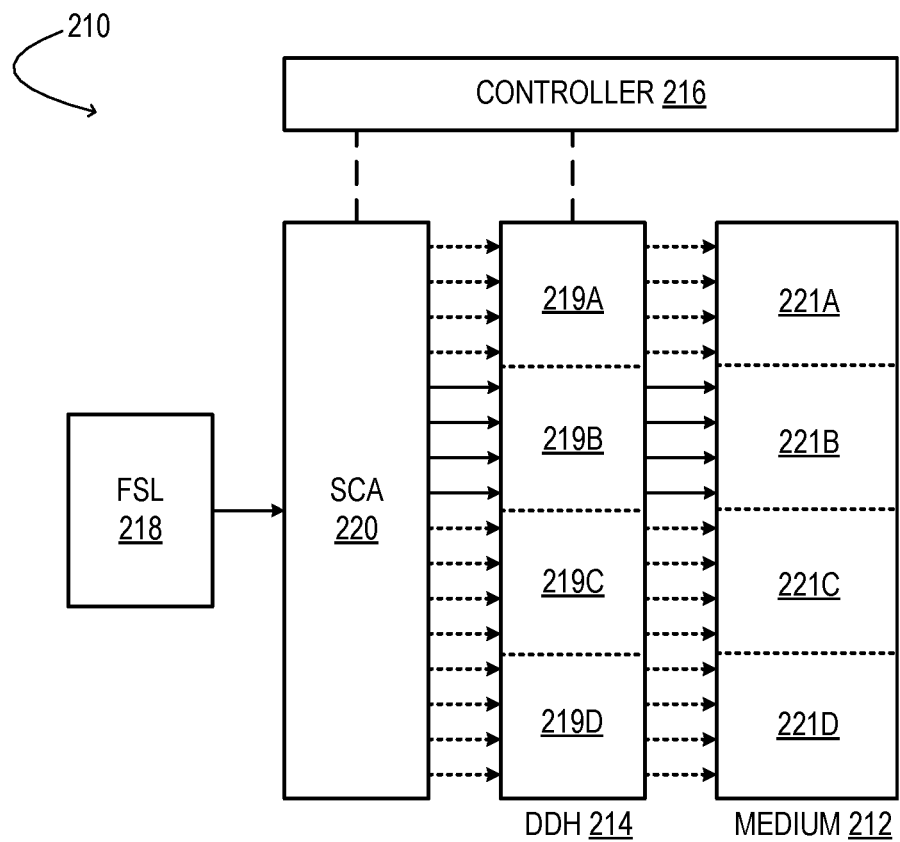
FIGS. 2-7 show aspects of example optical data-recording systems.

FIG. 2 shows a schematic diagram depicting aspects of an example optical data-recording system 210. Data-recording system 210 is configured to write and store data on optical recording medium 212. Optical recording medium 212 may differ in various examples, but generally includes a solid, dielectric substrate. In some examples, the substrate may be a polymer. In other examples, the substrate may be an inorganic glass, such as silica glass. Further, in some examples, the substrate may take the form of a relatively thin layer (e.g., 30 to 300 microns thick) coupled to a mechanically stable supporting layer. Additionally, in some examples, the substrate may take the form of an optical disk.

Continuing in FIG. 2, optical data-recording system 210 includes a DDH 214 operatively coupled to an electronic controller 216. Electronic controller 216 provides an electronic signal to the DDH that digitally defines a holographic projection consisting of a number of child beams. The holographic projection encodes the data sought to be written onto optical recording medium 212. More specifically, electronic controller 216 may be configured to control the irradiance directed from each holographic zone 219 of the DDH (e.g., 219A, 219B, 219C, 219D, etc.). The holographic projection so defined may comprise an array of child beam positions, with each beam having controllable phase and intensity. Thus, electronic controller 216 may be configured to control the irradiance of the child beams by individually addressing each of a plurality of hologram pixels in each of the plurality of holographic zones, each child beam being mapped to a corresponding voxel of the optical recording medium. It will be noted that the ratio of hologram pixel to child beam (and thus voxel) number is not necessarily to a 1:1 mapping, but may include 2:1, 4:1, and 10:1, among other suitable mappings.

DDH 214 is configured to produce the holographic projection by controllably, spatially modulating non-imaged laser irradiance received thereon, and directing spatially modulated irradiance to optical recording medium 212. In some examples, DDH 214 may comprise an electronically addressable SLM, though other technologies are also envisaged. For instance, the DDH may alternatively comprise an optically addressable SLM or an acoustooptical modulator. In some implementations, an acoustooptical modulator may be used in concert with other light-modulating technologies to produce the holographic projection.

In the configuration of FIG. 2, the source of irradiance for the DDH is a high-power laser in the form of FSL 218. In some implementations, FSL 218 may be one or more of Q-switched and mode-locked, to provide very brief pulses of very high energy. The irradiance from FSL 218 may comprise a repeating pulse train of subnanosecond photon pulses—e.g., tens to hundreds of femtoseconds in duration, for example. Other forms of laser irradiance are also envisaged.

As noted above, the array of pixel positions of DDH 214 may be grouped into a plurality of non-overlapping or marginally overlapping holographic zones 219, which are exposed sequentially to the laser beam. Although the holographic zones are illustrated schematically and one-dimensionally in FIG. 2, it will be understood that each holographic zone is actually a two-dimensional area, which may be of any desired shape—e.g., rectangular, wedge-shaped, ring-shaped, etc. Accordingly, optical data-recording system 210 includes a scanning mechanism configured to change the relative positioning of FSL 218 versus DDH 214, so that each of the holographic zones is irradiated in sequence by the laser. In particular, the electronic controller may be configured to advance the scanning mechanism to change the relative positioning of the laser versus the dynamic digital hologram. The scanning mechanism may be advanced a plurality of times (4, 9, 16 times, etc.) for each time that the DDH is addressed.

In the example shown in FIG. 2, the scanning mechanism takes the form of beam scanner (SCA) 220. Beam scanner 220 is configured to receive the irradiance from FSL 218 and direct the irradiance to each of the holographic zones 219 in sequence, such that the irradiance is directed by DDH 214 to a corresponding data zone 221 (e.g., 221A, 221B, 221C, 221D, etc.) of optical recording medium 212.

In the configuration of FIG. 2, the high-power beam from FSL 218 is deflected by SCA 220 such that it irradiates, consecutively, each of a plurality of holographic zones 219 of DDH 214. This action produces, in each irradiated zone, an array of child beams of independently controlled intensity and/or polarization state. The child beams impinge on optical recording medium 212, thereby writing onto the substrate the data encoded in the DDH. As noted hereinabove, the DDH need only be refreshed once for every E exposures of the substrate, and E may be set to a large value to increase both the instantaneous irradiance and the effective bandwidth of the DDH. In FIG. 2, the currently irradiated zone of the DDH is shown schematically as receiving solid rays from the beam scanner; other zones are shown as receiving dashed-line rays.

The nature of beam scanner 220 may differ in the various examples of this disclosure. Beam scanner 220 may include one or more mirrors of variable deflection, the variable deflection being controlled by the electronic controller. In general, the variable deflection may include one or both of a variable elevation and a variable azimuth orthogonal to the variable elevation. In the configurations envisaged herein, each of the one or more mirrors may be a resonant mirror, a rotating mirror, or a digital micromirror device (DMD). Alternatively, the beam scanner may include a rotating polygonal mirror with facet angles varied with respect to the axis of rotation of the mirror. In still other implementations, the beam scanner may comprise an acoustooptical element.

In some examples, optical data-recording system 210 may include (not shown in FIG. 2) an optional polarization-control element (PCE) integrated within or arranged optically downstream of the FSL, before or after the DDH. The PCE may be configured to set the polarization state of the laser irradiance. In some implementations, the optical data-recording system may also include (not shown in FIG. 2) an objective lens system and an objective scanning mechanism for the objective lens pupil. The objective scanning mechanism may help to ensure that the spatial and angular position of the holographic projection remains the same irrespective of the irradiated zone of DDH 214. Some implementations may also include an additional scanning mechanism configured to tilt the image formed by the DDH, so that the data is written to the appropriate voxels on the recording-medium substrate. These optional features are shown in figures described below.

Figure 3:
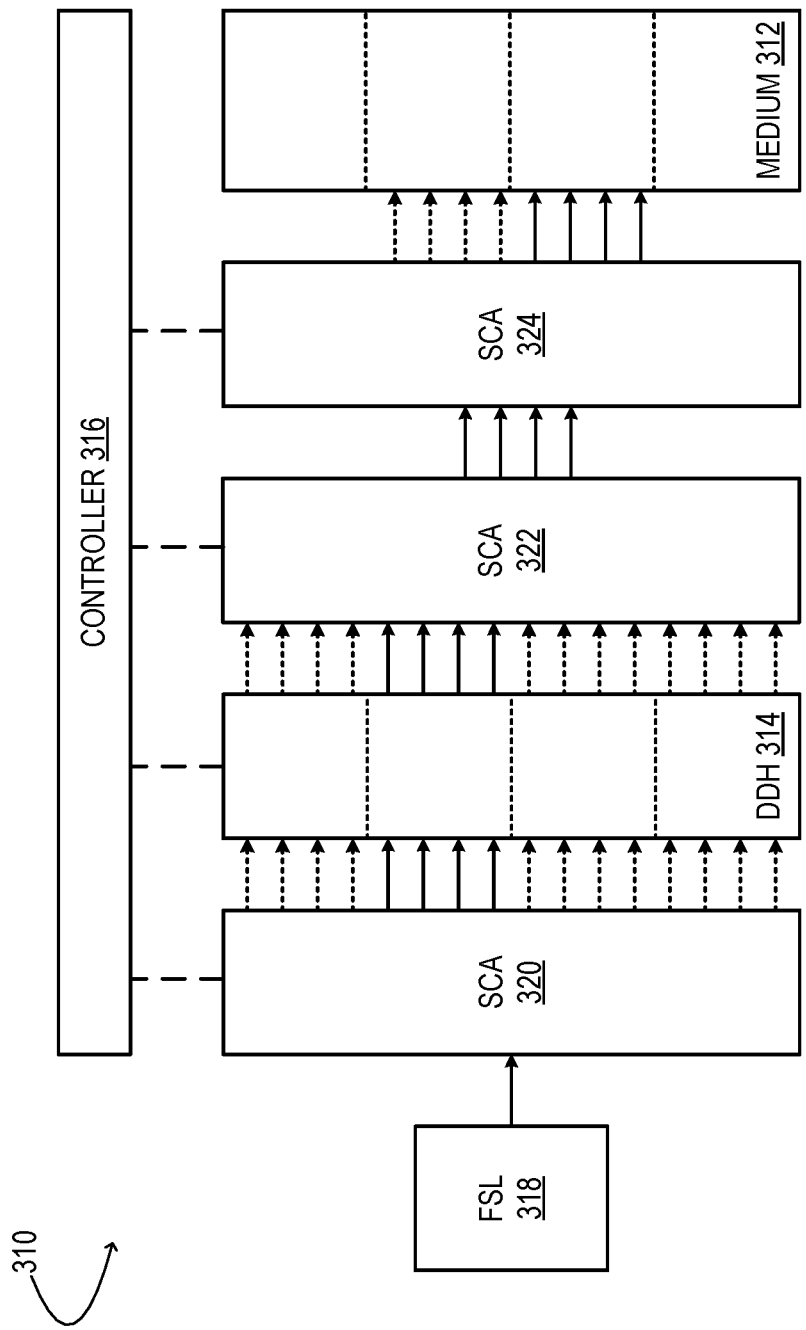

FIG. 3 schematically shows aspects of another example optical data-recording system 310. In this implementation, an upstream beam scanner 320 adds positional or angular shift into the laser beam prior to illumination of DDH 314. Downstream beam scanner 322 may be configured to cancel this positional or angular shift on the holographic projection. An objective scanner 324 may be used to impart a sufficiently large change in the angle of irradiance of optical recording medium 312 to illuminate different parts of the substrate. As in the previous example, electronic controller 316 is operatively coupled to FSL 318, to DDH 314, and to each of the beam scanners.

Figure 4:
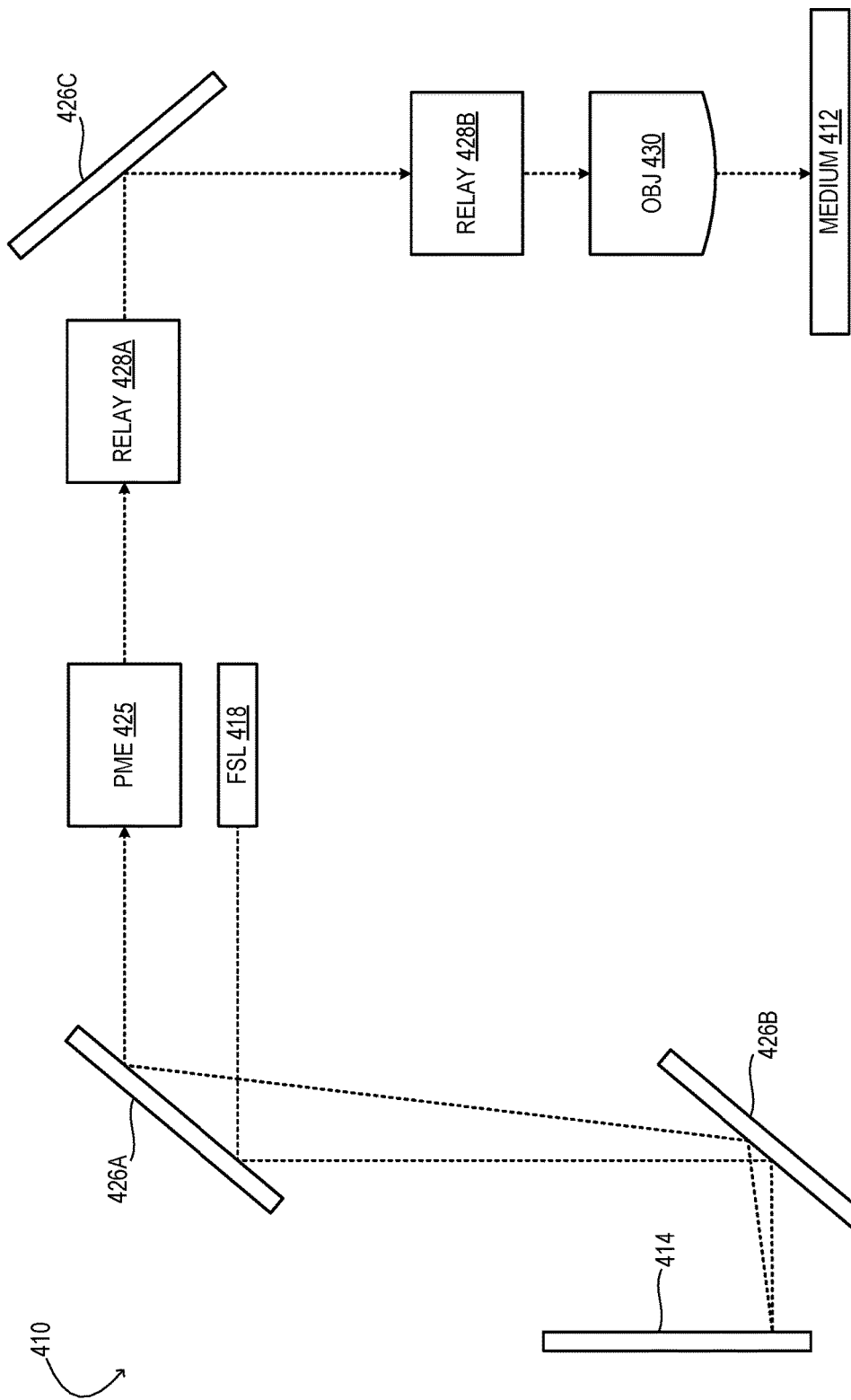

FIG. 4 schematically shows aspects of another example optical data-recording system 410. This configuration includes a pair of parallel or nearly parallel adjustable mirrors 426A and 426B, which receive irradiance from FSL 418 and impart a positional shift on the holographic projection from 'reflective' DDH 414. The deflection of each mirror may adjustable in one or two orthogonal directions via appropriate mirror-mount technology (rotating, resonant, DMD, etc.). The adjustable mirrors may be arranged so that the 'walk off' on the mirrors (i.e., the positional displacement), is cancelled when the irradiance is reflected from the DDH. The small delta between the angles of the two (nearly parallel) mirrors and the normal illumination of the DDH can be used to control the displacement of the out-coupling beam from the scanning mirrors relative to the incoming beam. In this example, the polarization state of the holographic image is adjusted via polarization-modulation element (PME) 425, as mentioned above. Another scanning mirror 426C changes the tilt or tip of the beam so that parts of optical recording medium 412 that are not accessible due to the limited resolution of the DDH may be written to. Relay optics 428A and 428B are configured to guide the holographic projection to and from the final scanning mirror, respectively. Objective lens system 430 is used to focus the holographic projection onto optical recording medium 412.

Figure 5:
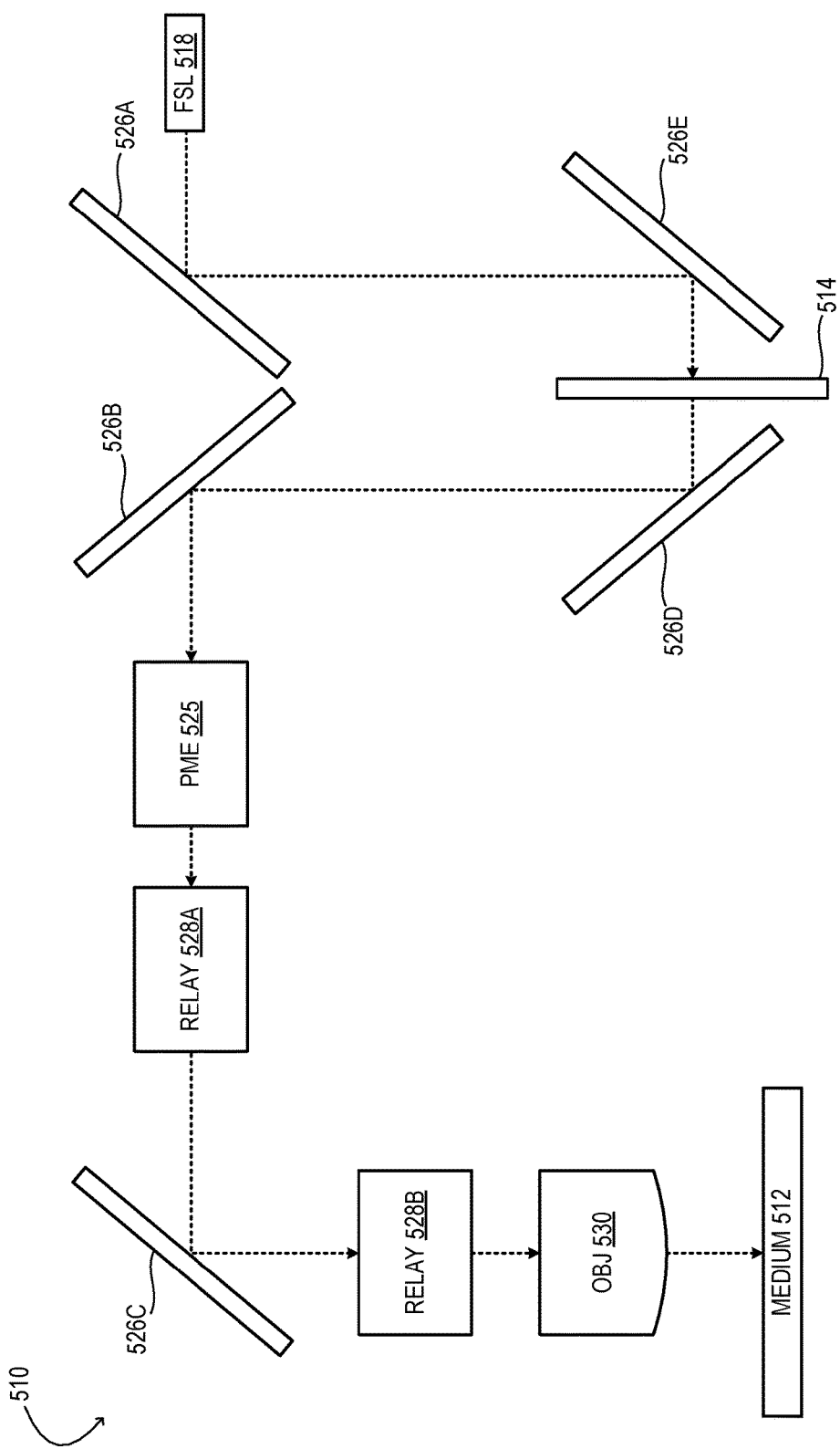

FIG. 5 shows aspects of another example recording system 510, which is similar to the example above, but employs a transmissive DDH 514. The arrangement of FSL 418, scanning mirrors 526A, 526B and 526C, PME 525, relay optics 528A and 528B, and objective lens system 530 is analogous to that shown in FIG. 4. In system 510, however, additional scanning mirrors 526D and 526E may be utilized to cancel the displacement of the beam on both sides of the DDH.

Figure 6:
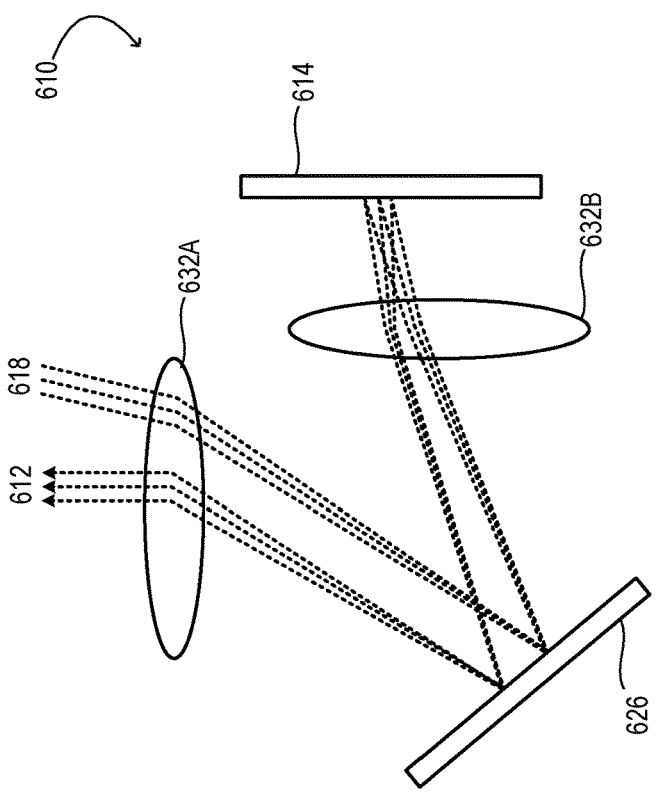

FIG. 6 shows aspects of another example optical data-recording system 610. In this configuration, the scanning mechanism is an angular beam scanner 626 in one or two dimensions. Lens 632A brings the irradiance from FSL 618 into focus on or near the surface of the angular beam scanner. Lens 632B maps the angular range of the angular beam scanner to a range of pixel positions (positional displacement) of DDH 614. With the reflective DDH shown in the drawing, the displacement is then cancelled by the light returning back through the same path. In particular, lens 632A not only receives irradiance from FSL 618 but also projects the holographic image onto optical recording medium 612; lens 632B completes the angular/positional translation at the focal plane of the DDH. In the transmissive variant of this example, an additional lens and additional scanner are used to cancel the positional/angular displacement of the beam. Finally, an objective scanner may be used to move the holographic projection to different locations on the optical recording medium. Further, in some implementations, lenses 632A and 632B may be combined. In some implementations, the optical system may be tilted by an appropriate angle, so that neither lens is necessary.

Figure 7:
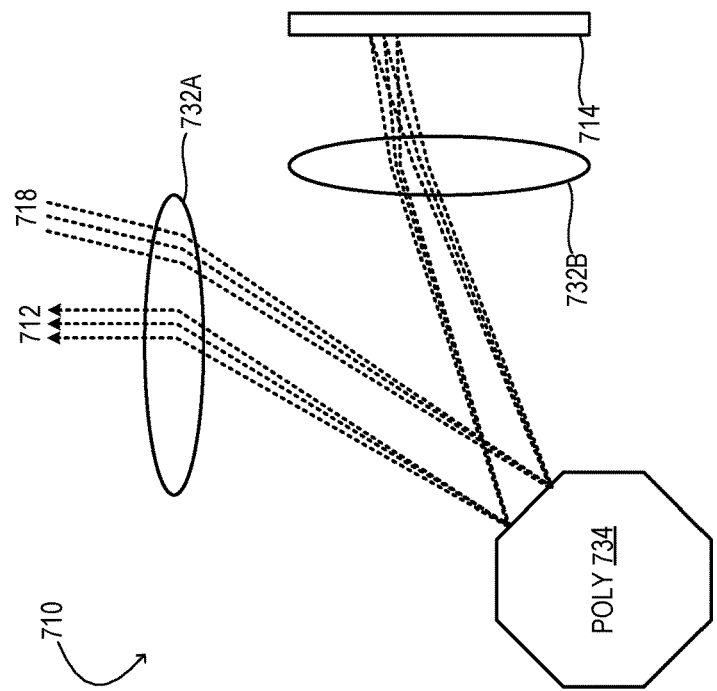

FIG. 7 shows aspects of another example optical data-recording system 710, in which the arrangement of FSL 718, optical recording medium 712, and lens system 732A/732B are as described above. In this example, however, the beam scanner includes a rotating polygon mirror 734. Such a scanner may be configured to scan in either one or two dimensions. For two-dimensional scanning, the rotating polygon mirror may include a plurality of facets, each oriented (in terms of its normal vector) at a different angle relative to the axis of rotation of the rotating polygon mirror.

As described herein, configurations comprising a DDH, and a beam scanner to scan different parts of the DDH, together with a pulsed laser and optional polarization-modulation mechanism may allow data to be written onto glass at an attractively high bandwidth. The beam scanner 'converts' the large spatial bandwidth of a DDH into a large temporal bandwidth. Further, the use of an efficient objective scanner allows a relatively small number of spots to be moved across the surface of the substrate, thereby covering a potentially large substrate area without necessarily moving the substrate. It will be noted, nevertheless, that the substrate may be moved in some implementations, such as by rotation.

Figure 8:
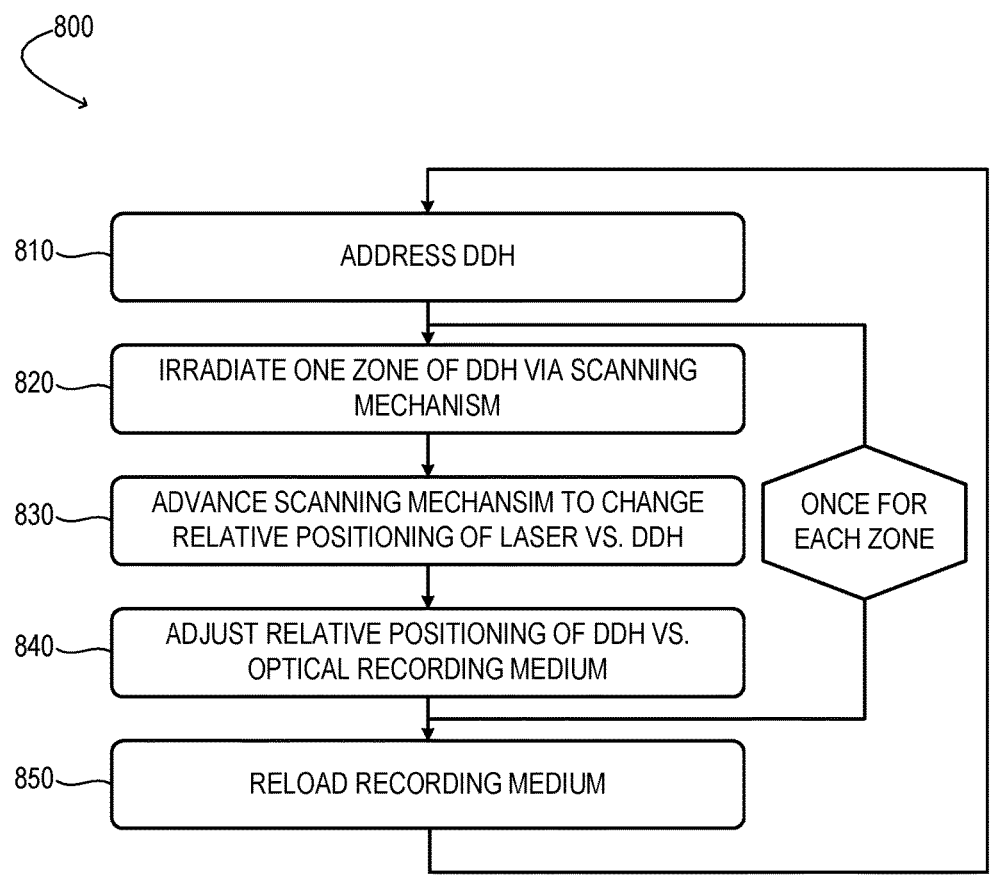
FIG. 8 illustrates aspects of an example optical data-recording method.

FIG. 8 illustrates an example method 800 to record data on an optical recording medium. Method 800 may be enacted using any of the optical data-recording systems disclosed herein, among others.

At 810 of method 800, a DDH is addressed so as to control an irradiance to be directed from each of a plurality of holographic zones of the DDH when the DDH is irradiated. At 820 one holographic zone of the DDH is irradiated with a laser, via a scanning mechanism. At 830 the scanning mechanism is advanced, thereby changing a relative positioning of the laser versus the DDH. In so doing, each of the holographic zones is irradiated in sequence with spatially modulated light from the laser. At 840 the relative positioning of the DDH versus the optical recording medium is adjusted, in order to accurately direct the irradiance from each of the plurality of holographic zones to each of a corresponding plurality of data zones of the optical recording medium. As noted above, the scanning mechanism may be advanced a plurality of times for each time that the DDH is addressed—e.g., once for every distinct holographic zone of the DDH or data zone of the optical recording medium. At 850 the written optical recording medium may be removed from the optical data-recording system, and a new optical recording medium provided. Execution of the method then resumes at 810, where the DDH is again addressed.

The foregoing description and drawings should not be considered in a limiting sense, because numerous variations, extensions, and omissions are contemplated as well. For instance, although electronically addressable DDHs are emphasized above, an optically addressable DDH may be used in some examples. This component may take the form of an optically addressable SLM (OASLM), for instance. An optically addressable DDH may receive its modulation signal in the form of an analog optical image and may be used to write either analog or digital data onto an optical recording medium. One implementation of this approach employs a rotating OASLM, in which the holographic projection is encoded optically in one location, and replayed at another location. By increasing the physical radius of the OASLM, the 'bandwidth' of the system can be increase commensurately. In still other implementations, a stack of rotating OASLMs may be included, with each providing a different functionality, such as splitting the beam into child beams or modulating the polarization of the beam(s).

Figure 9:
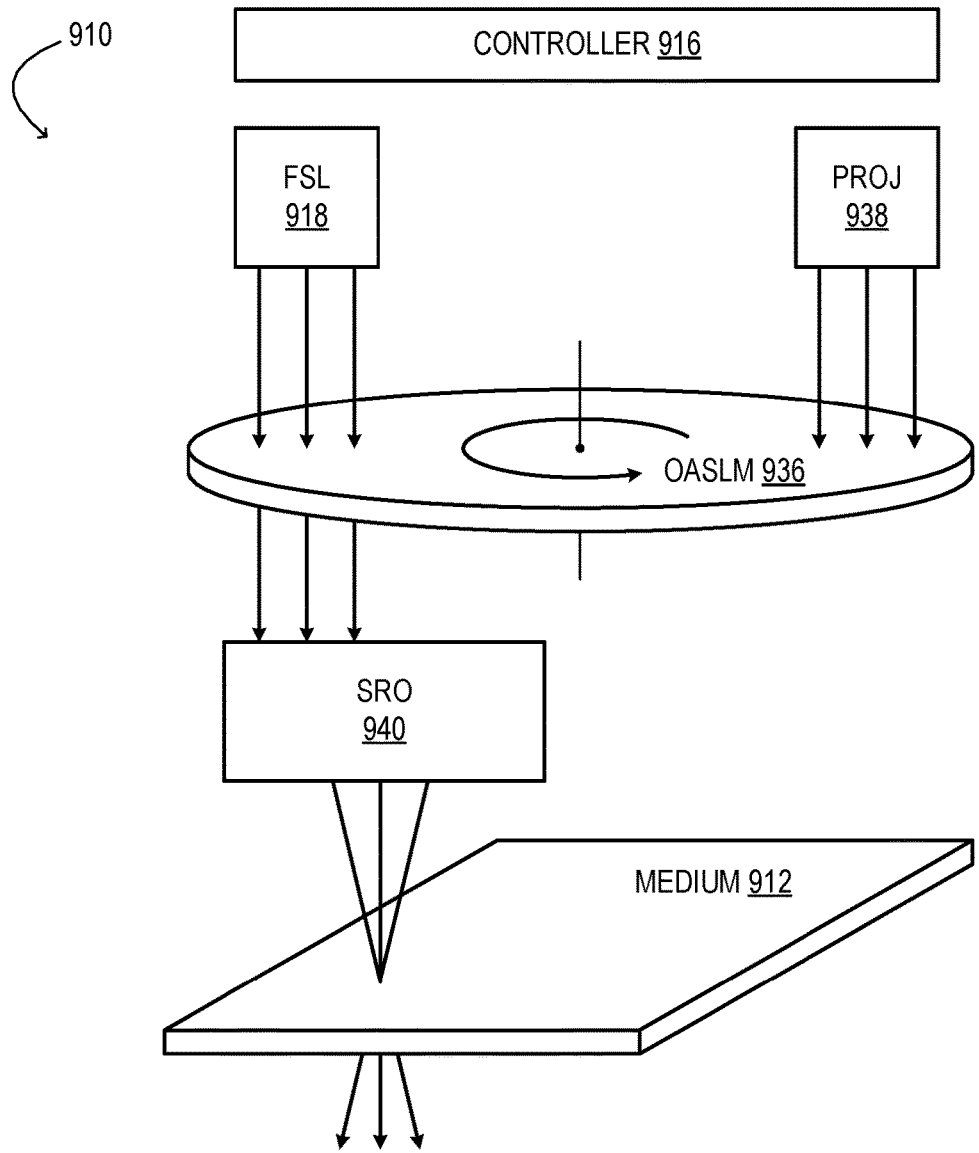
FIG. 9 shows aspects of another example optical data-recording system.

To illustrate, FIG. 9 shows aspects of another example optical data-recording system 910 that incorporates an OASLM 936. The modulation image for OASLM 936 is provided via projector 938, which projects onto OASLM 936 to optically address OASLM 936 and thereby control the irradiance to be directed from the each of the holographic zones of OASLM 936 during exposure. Electronic controller 916 is operatively coupled to the image projector and configured to provide the modulation image. Although OASLM 936 is an analog device, the projector may be modulated (spatially, and/or temporally with rotation) to create a digitally controlled illumination pattern on OASLM 936. This enables OASLM 936 to function as a DDH. As in the previous examples, the modulated irradiance from each of the holographic zones is directed onto corresponding data zones of optical recording medium 912. System 910 includes a rotational scanning mechanism configured to change the relative positioning of the laser versus OASLM 936 so that each of the holographic zones is irradiated in sequence by the laser. In other embodiments, the scanning mechanism may be translational. In the above implementation, beam scanning is achieved by keeping the optical system, including FSL 918, fixed and rotating OASLM 936, while scanning-relay-objective optics (SRO) 940 direct the holographic projection to the appropriate voxels of optical recording medium 912.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
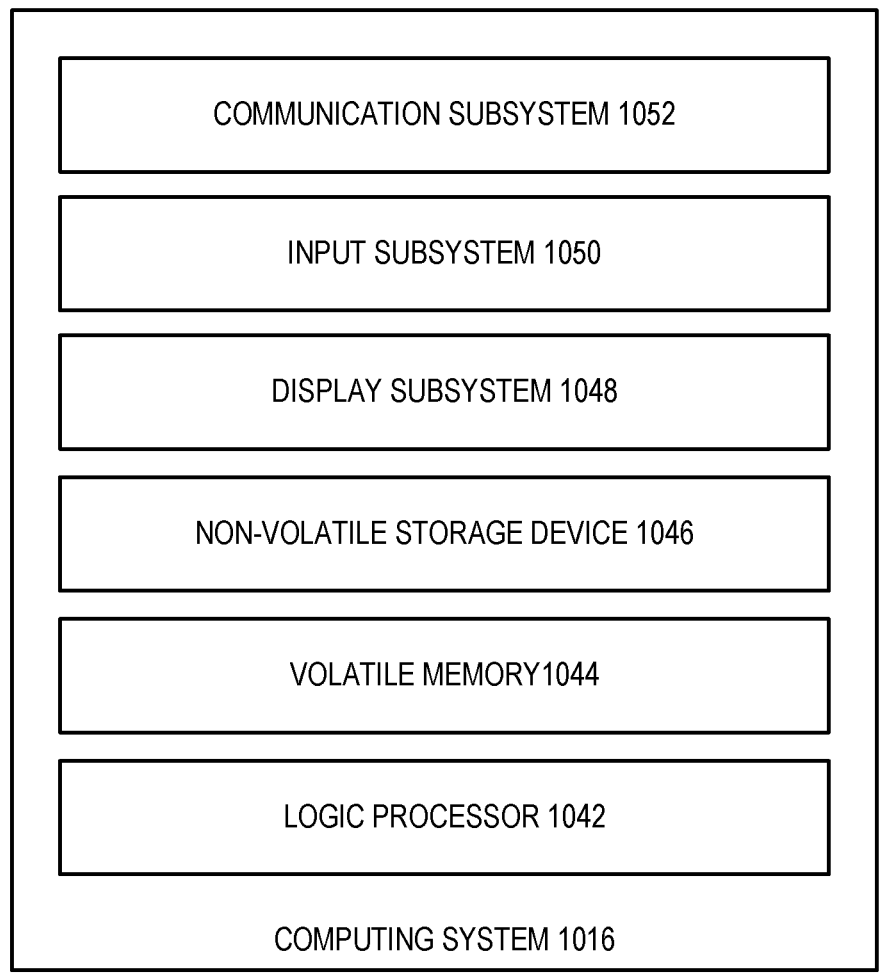
FIG. 10 shows aspects of an example computing system adaptable to the methods herein.

FIG. 10 schematically shows a non-limiting embodiment of a computing system 1016 that can enact one or more of the methods and processes described above. Computing system 1016 is shown in simplified form. Computing system 1016 may take the form of one or more benchtop or server computers and/or dedicated electronic controllers. Controllers 216, 316, and 916 are examples of computing system 1016.

Computing system 1016 includes a logic processor 1042 volatile memory 1044, and a non-volatile storage device 1046. Computing system 1016 may optionally include a display subsystem 1048, input subsystem 1050, communication subsystem 1052, and/or other components not shown in FIG. 10.

Logic processor 1042 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1042 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1046 includes one or more physical devices configured to hold instructions executable by the logic processors to implement the methods and processes described herein. When such methods and processes are implemented, the state of non-volatile storage device 1044 may be transformed—e.g., to hold different data.

Non-volatile storage device 1046 may include physical devices that are removable and/or built-in. Non-volatile storage device 1046 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1046 may include nonvolatile, dynamic, static, read/write, read-only, sequential-access, location-addressable, file-addressable, and/or content-addressable devices. It will be appreciated that non-volatile storage device 1046 is configured to hold instructions even when power is cut to the non-volatile storage device 1046.

Volatile memory 1044 may include physical devices that include random access memory. Volatile memory 1044 is typically utilized by logic processor 1042 to temporarily store information during processing of software instructions. It will be appreciated that volatile memory 1044 typically does not continue to store instructions when power is cut to the volatile memory 1044.

Aspects of logic processor 1042, volatile memory 1044, and non-volatile storage device 1046 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1048 may be used to present a visual representation of data held by non-volatile storage device 1046. The visual representation may take the form of a graphical user interface (GUI). As the herein described methods and processes change the data held by the non-volatile storage device, and thus transform the state of the non-volatile storage device, the state of display subsystem 1048 may likewise be transformed to visually represent changes in the underlying data. Display subsystem 1048 may include one or more display devices utilizing virtually any type of technology. Such display devices may be combined with logic processor 1042, volatile memory 1044, and/or non-volatile storage device 1046 in a shared enclosure, or such display devices may be peripheral display devices.

When included, input subsystem 1050 may comprise or interface with one or more user-input devices such as a keyboard, mouse, touch screen, etc. When included, communication subsystem 1052 may be configured to communicatively couple various computing devices described herein with each other, and with other devices. Communication subsystem 1052 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1016 to send and/or receive messages to and/or from other devices via a network such as the Internet.

One aspect of this disclosure is directed to an optical data-recording system comprising: a laser; a dynamic digital hologram including a plurality of holographic zones, the dynamic digital hologram being configured to direct irradiance received thereon to an optical recording medium; an electronic controller operatively coupled to the dynamic digital hologram to control the irradiance directed from each of the holographic zones; and a scanning mechanism configured to change a relative positioning of the laser versus the dynamic digital hologram so that each of the holographic zones is irradiated in sequence by the laser. In some implementations, the laser comprises a pulsed laser, and the irradiance is a repeating pulse train of sub-nanosecond photon pulses. In some implementations, the electronic controller is configured to control the irradiance of individual child beams by individually addressing each of a plurality of pixels of each of the plurality of holographic zones, each child beam being mapped to a corresponding voxel of the optical recording medium. In some implementations, the scanning mechanism includes a beam scanner configured to receive the irradiance from the laser and to direct the irradiance to each of the holographic zones in sequence, such that the irradiance is directed by the dynamic digital hologram to a corresponding data zone of the optical recording medium. In some implementations, the beam scanner includes one or more mirrors of variable deflection, and the variable deflection is controlled by the electronic controller. In some implementations, the variable deflection includes one or both of a variable elevation and a variable azimuth orthogonal to the variable elevation. In some implementations, each of the one or more mirrors comprises one or more of a resonant mirror, a rotating mirror, and a digital micromirror device. In some implementations, the beam scanner comprises a rotating polygon mirror having a plurality of facets, each facet oriented at a different angle relative to an axis of rotation of the rotating polygon mirror. In some implementations, the dynamic digital hologram includes an electronically addressable spatial light modulator. In some implementations, the dynamic digital hologram includes an optically addressable spatial light modulator. In some implementations, one or more of the scanning mechanism and the dynamic digital hologram comprises an acoustooptical modulator. In some implementations, the optical data-recording system further comprises an objective lens and an objective scanner. In some implementations, the electronic controller is configured to advance the scanning mechanism a plurality of times for each time that the dynamic digital hologram is addressed. In some implementations, the scanning mechanism includes an angular beam scanner and a lens system configured to map an angular range of the angular beam scanner to a range of pixels of the dynamic digital hologram.

Another aspect of this disclosure is directed to a method to record data on an optical recording medium, the method comprising: addressing a dynamic digital hologram so as to control an irradiance to be directed from each of a plurality of holographic zones of the hologram when the hologram is irradiated; irradiating a first holographic zone of the dynamic digital hologram with a laser, via a scanning mechanism; and advancing the scanning mechanism to change a relative positioning of the laser versus the dynamic digital hologram, so that each of the holographic zones is irradiated in sequence by the laser.

In some implementations, the scanning mechanism is advanced a plurality of times for each time that the dynamic digital hologram is addressed. In some implementations, the method further comprises adjusting a relative positioning of the dynamic digital hologram versus the optical recording medium to accurately direct the irradiance from each of the plurality of holographic zones to each of a corresponding plurality of data zones of the optical recording medium.

Another aspect of this disclosure is directed to an optical data-recording system comprising: a laser; a plurality of addressable spatial light modulator (OASLM) including a plurality of holographic zones, the OASLMs being configured to direct irradiance received thereon to an optical recording medium; an image projector configured to project an image onto the OASLM to optically address the OASLM and thereby control the irradiance directed from each of the holographic zones; and a scanning mechanism configured to change a relative positioning of the laser versus the OASLM so that each of the holographic zones is irradiated in sequence by the laser.

In some implementations, the scanning mechanism comprises a rotational scanning mechanism. In some implementations, the optical data-recording system further comprises an electronic controller operatively coupled to the image projector and configured to digitally control the image projected onto the OASLM, to optically address the OASLM.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical data-recording system comprising:
   a laser;
   a dynamic digital hologram including a plurality of independently programmed holographic zones, each configured to direct irradiance received thereon to an optical recording medium;
   an electronic controller operatively coupled to the dynamic digital hologram to control the irradiance directed through each of the independently programmed holographic zones; and
   a scanning mechanism configured to change a relative positioning of the laser versus the dynamic digital hologram, so that irradiance from the laser is directed in sequence over each of the independently programmed holographic zone.

2. The optical data-recording system of claim 1 wherein the laser comprises a pulsed laser, and wherein the irradiance is a repeating pulse train of subnanosecond photon pulses.

3. The optical data-recording system of claim 1 wherein the electronic controller is configured to control the irradiance of individual child beams by individually addressing each of a plurality of pixels of each of the plurality of holographic zones, each child beam being mapped to a corresponding voxel of the optical recording medium.

4. The optical data-recording system of claim 1 wherein the scanning mechanism includes a beam scanner configured to receive the irradiance from the laser and to direct the irradiance to each of the holographic zones in sequence, such that the irradiance is directed by the dynamic digital hologram to a corresponding data zone of the optical recording medium.

5. The optical data-recording system of claim 4 wherein the beam scanner includes one or more mirrors of variable deflection, and wherein the variable deflection is controlled by the electronic controller.

6. The optical data-recording system of claim 5 wherein the variable deflection includes one or both of a variable elevation and a variable azimuth orthogonal to the variable elevation.

7. The optical data-recording system of claim 5 wherein each of the one or more mirrors comprises one or more of a resonant mirror, a rotating mirror, and a digital micromirror device.

8. The optical data-recording system of claim 5 wherein the beam scanner comprises a rotating polygon mirror having a plurality of facets, each facet oriented at a different angle relative to an axis of rotation of the rotating polygon mirror.

9. The optical data-recording system of claim 1 wherein the dynamic digital hologram includes an electronically addressable spatial light modulator.

10. The optical data-recording system of claim 1 wherein the dynamic digital hologram includes an optically addressable spatial light modulator.

11. The optical data-recording system of claim 1 wherein one or more of the scanning mechanism and the dynamic digital hologram comprises an acoustooptical modulator.

12. The optical data-recording system of claim 1 further comprising an objective lens and an objective scanner.

13. The optical data-recording system of claim 1 wherein the electronic controller is configured to advance the scanning mechanism a plurality of times for each time that the dynamic digital hologram is addressed.

14. The optical data-recording system of claim 1 wherein the scanning mechanism includes an angular beam scanner and a lens system configured to map an angular range of the angular beam scanner to a range of pixels of the dynamic digital hologram.

15. A method to record data on an optical recording medium, the method comprising:
   addressing a plurality of holographic zones of a dynamic digital hologram so as to independently program each holographic zone and thereby control an irradiance to be directed from each holographic zone when irradiated;
   irradiating a first of the independently programmed holographic zones of the dynamic digital hologram with a laser, via a scanning mechanism; and
   advancing the scanning mechanism to change a relative positioning of the laser versus the dynamic digital hologram, so that irradiance from the laser is directed in sequence to each of the independently programmed holographic zones.

16. The method of claim 15 wherein the scanning mechanism is advanced a plurality of times for each time that the dynamic digital hologram is addressed.

17. The method of claim 15 further comprising adjusting a relative positioning of the dynamic digital hologram versus the optical recording medium to accurately direct the irradiance from each of the plurality of holographic zones to each of a corresponding plurality of data zones of the optical recording medium.

18. An optical data-recording system comprising:
   a laser;
   one or more optically addressable spatial light modulators (OASLMs), each OASLM including a plurality of holographic zones, and being configured to direct irradiance received on each of the holographic zones to an optical recording medium;
   an image projector configured to project an image onto each of the holographic zones of the one or more OASLMs, so as to independently program each of the holographic zones and thereby control the irradiance directed from each of the holographic zones; and
   a scanning mechanism configured to change a relative positioning of the laser versus the one or more OASLMs, so that irradiance from the laser is directed in sequence to each of the independently programmed holographic zones.

19. The optical data-recording system of claim 18 wherein the scanning mechanism comprises a rotational scanning mechanism.

20. The optical data-recording system of claim 18 further comprising an electronic controller operatively coupled to the image projector and configured to digitally control the image projected onto the one or more OASLMs, to optically address the one or more OASLMs.

* * * * *